US008078728B1

(12) United States Patent
Pollan et al.

(10) Patent No.: US 8,078,728 B1
(45) Date of Patent: Dec. 13, 2011

(54) CAPACITY POOLING FOR APPLICATION RESERVATION AND DELIVERY

(75) Inventors: C. Evan Pollan, Austin, TX (US); Neal R. Prager, Austin, TX (US); Sameer S. Jagtap, Austin, TX (US)

(73) Assignee: Quest Software, Inc., Aliso Viego, CA (US)

( * ) Notice: Subject to any disclaimer, the term of this patent is extended or adjusted under 35 U.S.C. 154(b) by 793 days.

(21) Appl. No.: 11/690,254

(22) Filed: Mar. 23, 2007

Related U.S. Application Data

(60) Provisional application No. 60/788,129, filed on Mar. 31, 2006.

(51) Int. Cl.
*G06F 15/16* (2006.01)
*G06F 15/173* (2006.01)
*G06F 15/177* (2006.01)

(52) U.S. Cl. ............... 709/226; 709/223; 714/19; 718/1

(58) Field of Classification Search .......... 709/217–228; 714/19; 718/1
See application file for complete search history.

(56) References Cited

U.S. PATENT DOCUMENTS

| | | | |
|---|---|---|---|
| 4,912,628 A | 3/1990 | Briggs | |
| 5,062,037 A | 10/1991 | Shorter et al. | |
| 5,201,049 A | 4/1993 | Shorter | |
| 5,611,050 A | 3/1997 | Theimer et al. | |
| 5,757,924 A | 5/1998 | Friedman et al. | |
| 5,802,290 A | 9/1998 | Casselman | |
| 5,805,824 A | 9/1998 | Kappe | |
| 5,917,997 A | 6/1999 | Bell et al. | |
| 5,996,026 A | 11/1999 | Onodera et al. | |
| 5,999,518 A | 12/1999 | Nattkemper et al. | |
| 6,003,050 A | 12/1999 | Silver et al. | |
| 6,006,264 A | 12/1999 | Colby et al. | |
| 6,023,724 A | 2/2000 | Bhatia et al. | |
| 6,038,566 A | 3/2000 | Tsai | |
| 6,041,347 A | 3/2000 | Harsham et al. | |
| 6,067,545 A | 5/2000 | Wolff | |
| 6,069,894 A | 5/2000 | Holender et al. | |
| 6,075,938 A | 6/2000 | Bugnion et al. | |
| 6,092,178 A | 7/2000 | Jindal et al. | |
| 6,104,699 A | 8/2000 | Holender et al. | |
| 6,118,784 A | 9/2000 | Tsuchiya et al. | |
| 6,130,892 A | 10/2000 | Short et al. | |

(Continued)

OTHER PUBLICATIONS

Henry Baltazar, Virtual Storage Age, eWEEK, pp. 45 and 48, Aug. 27, 2001, Ziff Davis Media Inc., New York, New York.

(Continued)

*Primary Examiner* — Haresh N Patel
(74) *Attorney, Agent, or Firm* — Knobbe Martens Olson & Bear, LLP

(57) ABSTRACT

An application reservation and delivery system with capacity pooling including a logical resource pool, an application library, a resource manager, and a deployment manager. The logical resource pool includes computer resource assets which includes asset type, amount, and asset source in which each computer resource asset is decomposed to a specified level of granularity. The application library includes application configurations, each including at least one server configuration and computer resource asset requirements. The resource manager tracks availability of the computer resource assets, receives requests for specific application configurations for specified time periods, compares each requested application configuration with available computer resource assets at the specified time periods, and reserves resources for each requested application configuration during the specified time periods. The deployment manager deploys each requested application configuration using the reserved resources.

20 Claims, 8 Drawing Sheets

U.S. PATENT DOCUMENTS

| | | |
|---|---|---|
| 6,185,601 B1 | 2/2001 | Wolff |
| 6,192,417 B1 | 2/2001 | Block et al. |
| 6,247,057 B1 | 6/2001 | Barrera, III |
| 6,256,637 B1 | 7/2001 | Venkatesh et al. |
| 6,263,358 B1 | 7/2001 | Lee et al. |
| 6,272,523 B1 | 8/2001 | Factor |
| 6,272,537 B1 | 8/2001 | Kekic et al. |
| 6,282,602 B1 | 8/2001 | Blumenau et al. |
| 6,347,328 B1 | 2/2002 | Harper et al. |
| 6,370,560 B1 | 4/2002 | Robertazzi et al. |
| 6,453,426 B1 | 9/2002 | Gamache et al. |
| 6,496,847 B1 | 12/2002 | Bugnion et al. |
| 6,535,511 B1 | 3/2003 | Rao |
| 6,553,401 B1 | 4/2003 | Carter et al. |
| 6,567,839 B1 | 5/2003 | Borkenhagen et al. |
| 6,571,283 B1 | 5/2003 | Smorodinsky |
| 6,607,545 B2 | 8/2003 | Kammerer et al. |
| 6,609,213 B1 | 8/2003 | Nguyen et al. |
| 6,625,705 B2 | 9/2003 | Yanai et al. |
| 6,633,916 B2 | 10/2003 | Kauffman |
| 6,640,239 B1 | 10/2003 | Gidwani |
| 6,665,304 B2 | 12/2003 | Beck et al. |
| 6,745,303 B2 | 6/2004 | WataWatanabe |
| 6,760,775 B1 | 7/2004 | Anerousis et al. |
| 6,865,613 B1 | 3/2005 | Millet et al. |
| 6,880,002 B2 | 4/2005 | Hirschfeld et al. |
| 6,931,003 B2 | 8/2005 | Anderson |
| 6,985,479 B2 | 1/2006 | Leung et al. |
| 6,985,485 B2 | 1/2006 | Tsuchiya et al. |
| 6,985,937 B1 | 1/2006 | Keshav et al. |
| 6,990,666 B2 * | 1/2006 | Hirschfeld et al. ........... 718/104 |
| 7,020,720 B1 | 3/2006 | Donahue et al. |
| 7,043,665 B2 | 5/2006 | Kern et al. |
| 7,065,589 B2 | 6/2006 | Yamagami |
| 7,076,560 B1 | 7/2006 | Lango et al. |
| 7,139,841 B1 | 11/2006 | Somasundaram et al. |
| 7,154,891 B1 | 12/2006 | Callon |
| 7,200,622 B2 | 4/2007 | Nakatani et al. |
| 7,215,669 B1 | 5/2007 | Rao |
| 7,219,161 B1 | 5/2007 | Fagundo et al. |
| 7,222,172 B2 | 5/2007 | Arakawa et al. |
| 7,234,075 B2 | 6/2007 | Sankaran et al. |
| 7,280,557 B1 | 10/2007 | Biswas et al. |
| 7,287,186 B2 | 10/2007 | McCrory et al. |
| 7,356,679 B1 | 4/2008 | Le et al. |
| 7,421,505 B2 | 9/2008 | Berg |
| 7,574,496 B2 | 8/2009 | McCrory et al. |
| 2002/0065864 A1 | 5/2002 | Hartsell et al. |
| 2002/0103889 A1 | 8/2002 | Markson et al. |
| 2002/0129082 A1 | 9/2002 | Baskey et al. |
| 2002/0152310 A1 | 10/2002 | Jain et al. |
| 2002/0159447 A1 | 10/2002 | Carey et al. |
| 2002/0184642 A1 | 12/2002 | Lude et al. |
| 2002/0194251 A1 * | 12/2002 | Richter et al. ................ 709/105 |
| 2003/0005104 A1 * | 1/2003 | Deboer et al. ................ 709/223 |
| 2003/0005166 A1 | 1/2003 | Seidman |
| 2003/0018927 A1 | 1/2003 | Gadir et al. |
| 2003/0023774 A1 | 1/2003 | Gladstone et al. |
| 2003/0105829 A1 | 6/2003 | Hayward |
| 2003/0188233 A1 | 10/2003 | Lubbers et al. |
| 2004/0044778 A1 | 3/2004 | Alkhatib et al. |
| 2004/0052216 A1 | 3/2004 | Roh |
| 2004/0078467 A1 | 4/2004 | Grosner et al. |
| 2004/0186905 A1 * | 9/2004 | Young et al. .................. 709/225 |
| 2005/0013280 A1 | 1/2005 | Buddhikot et al. |
| 2005/0044220 A1 * | 2/2005 | Madhavan .................... 709/225 |
| 2005/0228835 A1 | 10/2005 | Roa |
| 2005/0229175 A1 | 10/2005 | McCrory et al. |
| 2005/0240668 A1 * | 10/2005 | Rolia et al. .................... 709/223 |
| 2005/0240964 A1 | 10/2005 | Barrett |
| 2005/0246436 A1 | 11/2005 | Day et al. |
| 2005/0249199 A1 | 11/2005 | Albert et al. |
| 2006/0013209 A1 | 1/2006 | Somasundaram |
| 2006/0136490 A1 * | 6/2006 | Aggarwal et al. ......... 707/103 R |
| 2006/0282892 A1 | 12/2006 | Jonnala et al. |
| 2006/0288251 A1 * | 12/2006 | Jackson .......................... 714/19 |
| 2007/0005769 A1 * | 1/2007 | Ammerlaan et al. ......... 709/226 |
| 2007/0088721 A1 * | 4/2007 | Srivastava .................... 707/100 |
| 2007/0180453 A1 * | 8/2007 | Burr et al. .................... 718/105 |

OTHER PUBLICATIONS

Long et al., "Swift/RAID: A Distributed RAID System" Summer 1994, Computing Systems, vol. 7, Issue 3, Jul. 31.
Michael Vizard, Automated help is on the horizon, Info-World, Mar. 1, 2002, InfoWorld Media Group, San Francisco, CA.
PCT Notification of Transmittal of the International Search Report or the Declaration for PCT/US02/28011, dated Feb. 25, 2003, 5 pages.
PCT Notification of Transmittal of the International Search Report or the Declaration for PCT/US02/40286, dated Mar. 28, 2003, 3 pages.
Stonebraker et al., "Distributed RAID—A New Multiple Copy Algorithm", 1990, IEEE, Dec. 31.

* cited by examiner

CAPACITY POOLING FOR APPLICATION RESERVATION AND DELIVERY

CROSS-REFERENCE TO RELATED APPLICATIONS

This application claims the benefit of U.S. Provisional Application Ser. No. 60/788,129 filed on Mar. 31, 2006 which is incorporated herein by reference for all intents and purposes.

BACKGROUND OF THE INVENTION

1. Field of the Invention

The present invention relates to application reservation and delivery, and more specifically, to an application reservation and delivery system with capacity pooling which defines application configurations in an application library, which pools computer resource assets, which lists computer resource assets, and which manages computer resources to deploy requested application configurations during a reserved future time period.

2. Description of the Related Art

Modeling capacity to satisfy the needs of on-demand application delivery is challenging, especially in the face of application configurations with heterogeneous resource requirements. For example, an application requiring 2 small virtual machines and an application requiring 1 large virtual machine might end up consuming effectively the same capacity from a virtualization host. At delivery time, however, the resources required for each of the 2 applications need to be accounted for and configured differently. Prior application delivery systems were limited to hosts preconfigured for specific application configurations, did not accurately account for or track computing assets, and had limited scheduling capability.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 6:
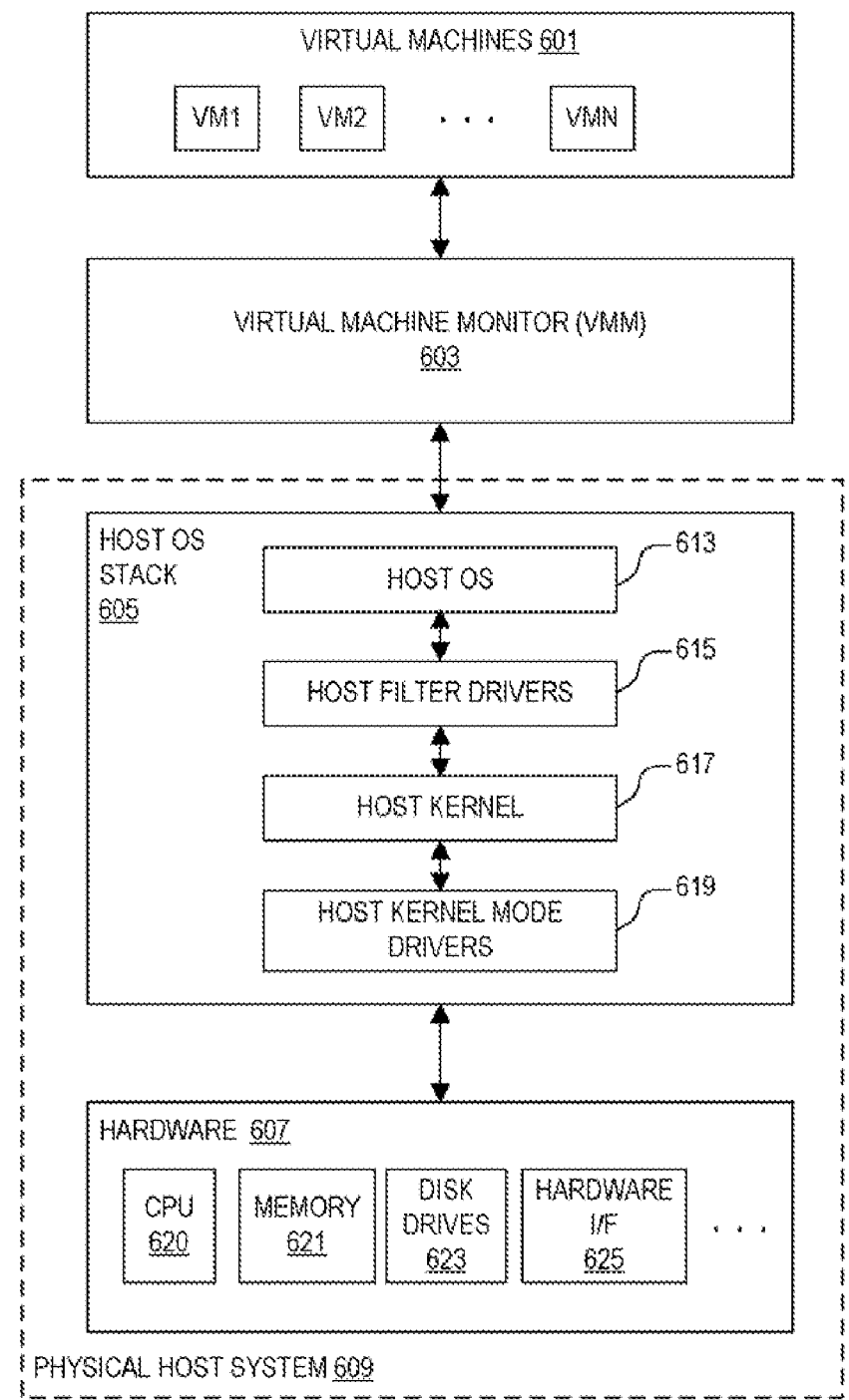
FIG. 6 is a block diagram of an exemplary architecture of a virtualization host according to an exemplary embodiment for implementing and supporting virtual servers or virtual machines.

FIG. 6 is a block diagram of an exemplary architecture of a virtualization host 600 according to an exemplary embodiment for implementing and supporting virtual servers or virtual machines (VMs). The terms "virtual machine" and "virtual server" are generally used interchangeably in which a virtual server is a virtual machine operating in a server capacity. The virtualization host 600 includes an underlying physical host system 609 similar to a typical physical server or computer system. The physical host system 609 includes a host operating system (OS) stack 605 and physical hardware 607. The OS may be any one of existing or known operating systems, such as, for example, Linux, Microsoft versions (e.g., Windows® 98, Windows® 2000, Windows NT®, Windows® XP, etc.). As understood by those skilled in the art of server systems, the host OS stack 605 includes a host OS 613 interfacing host filter drivers 615, which interface a host kernel 617, which further interfaces host kernel mode drivers 619. The host kernel mode drivers 619 provide the interface to the physical hardware 607, which includes various hardware components, such as a processor or central processing unit (CPU) 620, memory 621, one or more disk drives 623, a hardware interface (I/F) 625, etc. The CPU 620 may be of any type and may further be configured as a multiprocessor system. The memory 621 comprises any suitable type of volatile random access memory (RAM). The disk drives 623 include any suitable type of read/write (R/W) storage mediums. The hardware I/F 625 incorporates one or more communication interfaces as further described below.

A virtual machine monitor (VMM) 603 is installed as an application of the host OS 613, which effectively forms a software abstraction layer between the physical host system 609 and one or more VMs 601. As shown, a number "N" VMs are shown VM1, VM2, . . . , VMN. It is appreciated that any number (one or more) of VMs may be defined for any given physical server depending upon its performance and capabilities. Each VM 601 is implemented as a layered stack of functions in a similar manner as the host OS stack 105. In particular, each VM 601 includes a VM OS (not shown) interfacing VM filter drivers (not shown), which interface a VM kernel (not shown), which further interfaces VM kernel mode drivers (not shown). The VM kernel mode drivers further interface virtual hardware (not shown) at the bottom of the virtual stack of each VM 601. The VMs collectively share the resources of the underlying physical host system 609. A physical server or host system supporting virtualization is referred to herein as a virtualization host.

Figure 7:
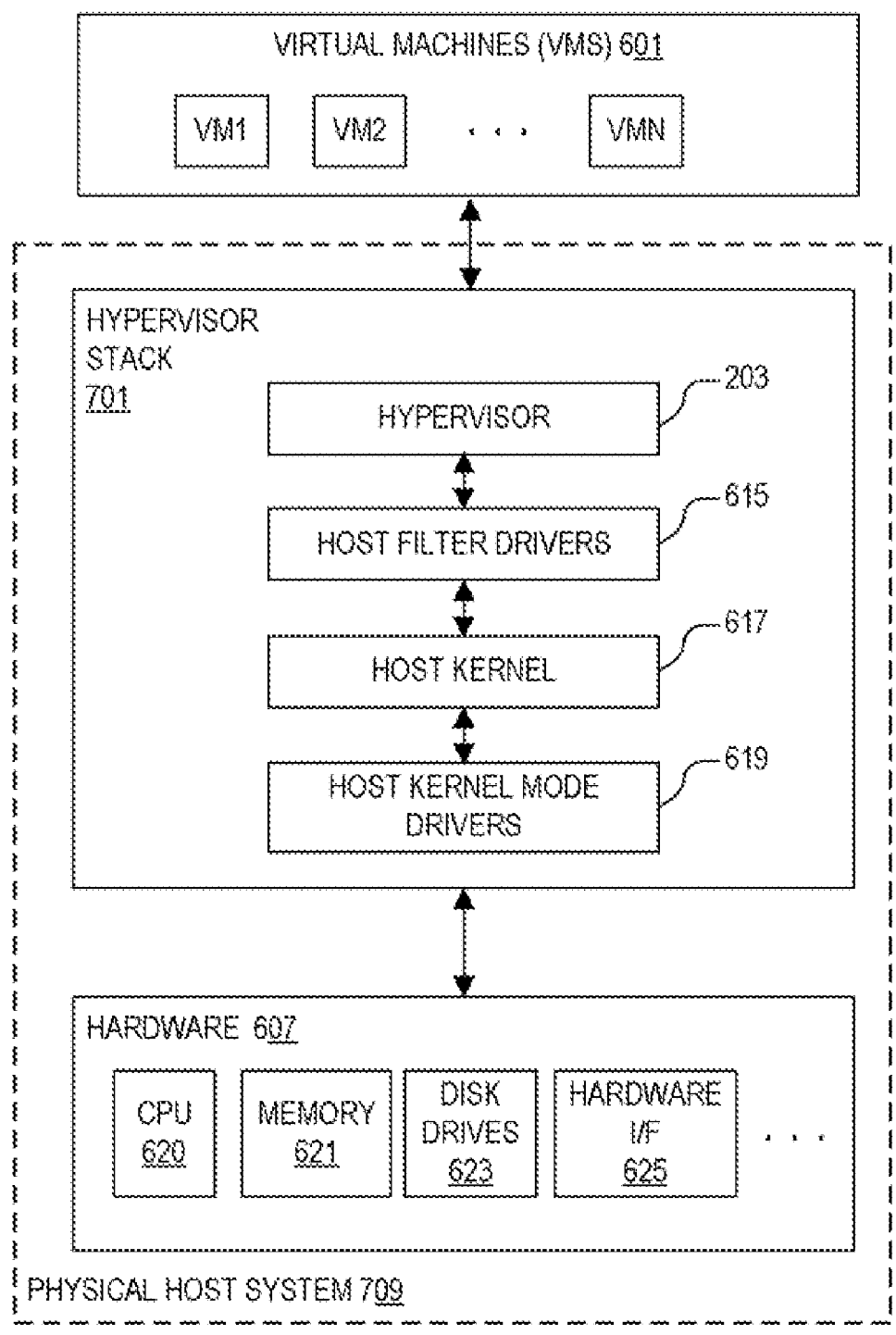
FIG. 7 is a block diagram of an exemplary architecture of a virtualization host implemented according to an alternative embodiment for implementing and supporting virtual machines.

FIG. 7 is a block diagram of an exemplary architecture of a virtualization host 700 implemented according to an alternative embodiment for implementing and supporting virtual machines (VMs). The virtualization host 700 is shown including the VMs 701 interfacing a physical host system 709, which includes a hypervisor stack 701 and the hardware 607. The hardware 607 remains substantially unmodified. The physical host system 709 is substantially similar to the physical host system 609 except that the VMM 603 and host OS 613 are collectively replaced by a hypervisor 703, which directly interfaces the VMs 601 and any other VMs in the system. Thus, the host OS stack 605 is replaced by a hypervisor stack 701 in which the hypervisor 703 interfaces directly with the host filter drivers 615. The host kernel 617 and host kernel mode drivers 619 are shown included in the hypervisor stack 701 in the same manner as for the host OS stack 605. It is appreciated by those skilled in the art, however, that any one or more of the host filter drivers 615, the host kernel 617 and the host kernel mode drives 619 may be modified for optimal performance of, and compatibility with, the hypervisor stack 701. It is appreciated by those skilled in the art that minor modifications may be made for purposes of compatibility with the hypervisor configuration.

Figure 8:
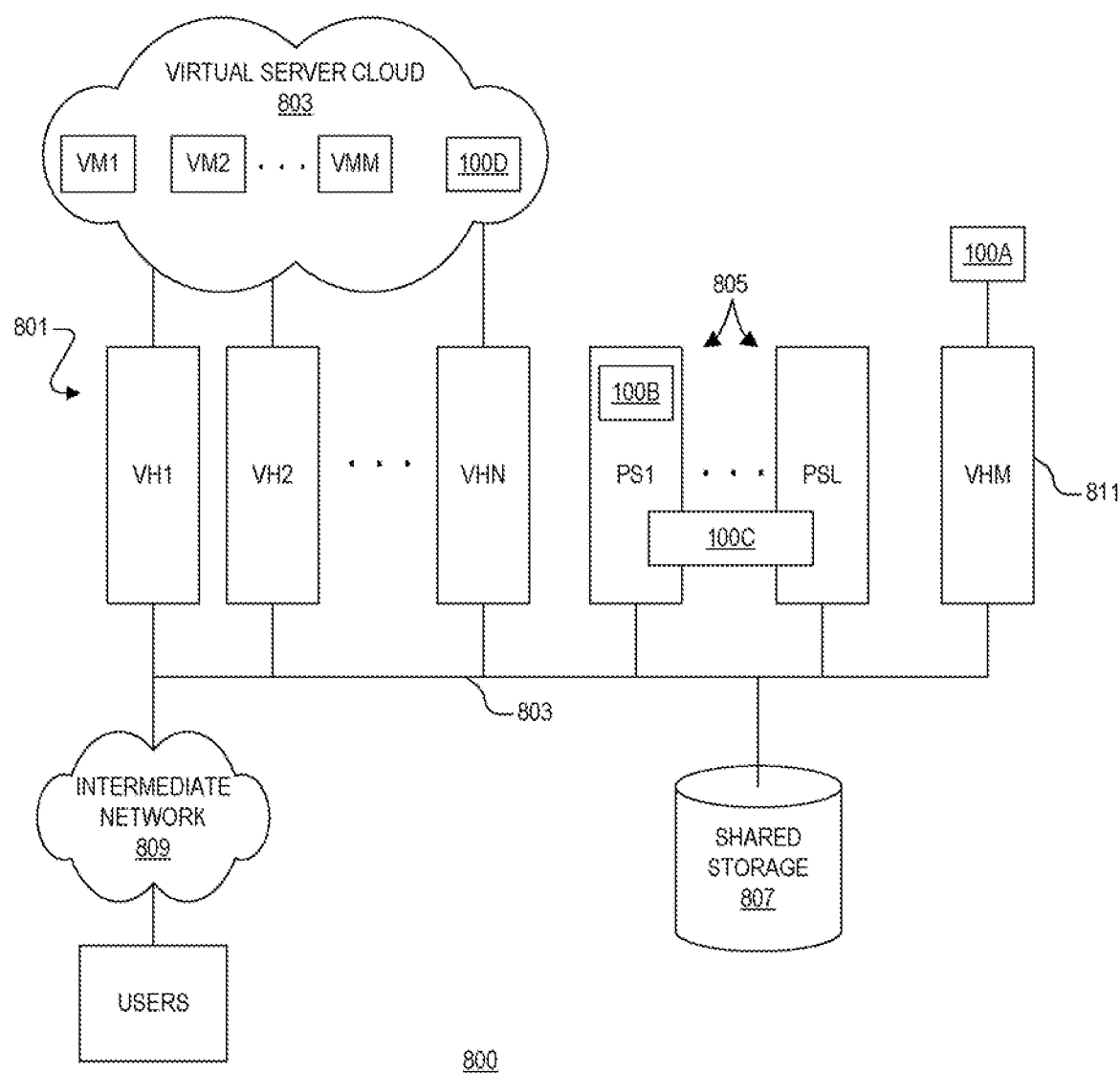
FIG. 8 is a block diagram of a data center system for supporting capacity pooling for on-demand application delivery according to one embodiment.

FIG. 8 is a block diagram of a data center system 800 for supporting capacity pooling for on-demand application delivery according to one embodiment. The data center system 800 includes a bank of "N" virtualization hosts 801, individually labeled VH1, VH2, ..., VHN linked together via a shared network 803. Each virtualization host may be implemented according to the virtualization host 600 or the virtualization host 700 or according to any other suitable virtualization configuration as known to those skilled in the art. The bank of virtualization hosts 801 collectively implements and supports a virtual server cloud 803 including an number "M" VMs, shown as VM1, VM2, ..., VMM. The data center system 800 further includes a bank of "L" physical servers 805, individually labeled PS1, ..., PSL, coupled to the network 803. A shared storage 807 is shown coupled to the network 803, which may include a single device (e.g. System Area Network (SAN)) or which may be divided into multiple physical and logical devices (e.g., File Transfer Protocol (FTP) and Network Attached Storage (NAS) or the like). It is noted that network and storage resources may be shared between the virtualization hosts 801 and physical servers 805 using an Ethernet or Fiber switching fabric. Access to the network and storage resources is typically logical rather than physical. One or more end-users or "users" are remotely linked to the data center system 800 via an intermediate network 809 coupled to the network 803. The intermediate network 809 represents any suitable type of network system for remotely accessing computer servers and resources, such as including or linked to the globally-accessible Internet. The users access and communicate via the intermediate network 809 using computer or terminal devices or the like as understood by those skilled in the art.

An on-demand application delivery system 100 according to an embodiment of the present invention is supported by or otherwise linked to the data center system 800. The on-demand application delivery system 100 exists as a file system, relational database, links to computing resources, etc. Various alternative embodiments of the system 100 are shown as systems 100A, 100B, 100C or 100D within the data center system 800, although it is appreciated that the various embodiments illustrated are exemplary only and other embodiments are possible. In one embodiment, the on-demand application delivery system 100 is implemented as a separate virtualized application configuration 100A implemented using one or more virtual machines or virtual servers supported by an underlying virtualization host manager (VHM) 811 coupled to the network 803. In another embodiment illustrated, the on-demand application delivery system 100 is implemented as a set of applications operating on a selected one of the physical servers 805, such as an on-demand application delivery system 100B shown residing on the physical server PS1. In another embodiment illustrated, the on-demand application delivery system 100 is implemented as a set of applications operating on multiple ones of the physical servers 805, such as an on-demand application delivery system 100C shown spanning the physical servers PS1 and PS2. In yet another embodiment illustrated, the on-demand application delivery system 100 is implemented as a virtualized application configuration including one or more virtual machines or virtual servers within the virtual server cloud 803, such as an on-demand application delivery system 100D shown within the virtual server cloud 803. In any of the embodiments of the on-demand application delivery system 100, the remote end users submit application requests via the intermediate network 809, which are intercepted and handled by the on-demand application delivery system 100. The on-demand application delivery system 100 reserves the resources for the application configuration and deploys the application at the appropriate time in accordance with that described herein.

Figure 1:
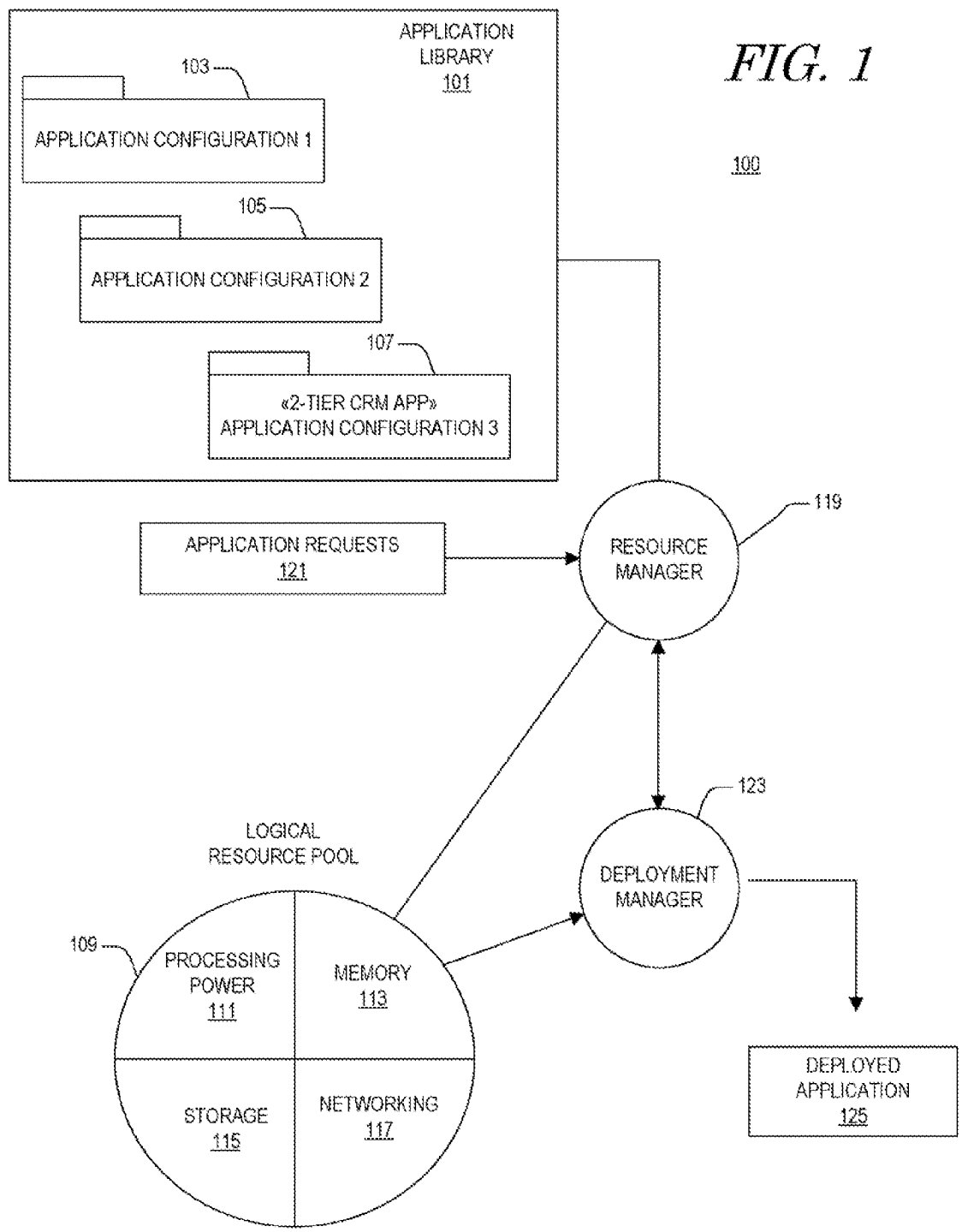
FIG. 1 is a simplified graphic representation of an on-demand application delivery system implemented according to an exemplary embodiment which may be implemented and supported within the data center system of FIG. 8.

FIG. 1 is a simplified graphic representation of an on-demand application delivery system 100 implemented according to an exemplary embodiment which may be implemented and supported within the data center system 800 as previously described. On-demand application delivery as described herein is a computing paradigm in which applications are delivered to users via a pool of computing capacity rather than as dedicated and/or static computing resources. As shown, administrators publish different application "configurations" to an application library 101, each application configuration defining its own computing capacity requirements in addition to a software stack comprising the application itself. It is noted that the application library 101 may be thought of as a "software" library since each user needs a particular set of software applications to meet their needs. An underlying hardware configuration is provided to the support the requested software applications at particular performance levels. The illustrated application library 101 includes three separate application configurations, including application configuration 103 (application configuration 1), application configuration 105 (application configuration 2) and application configuration 107 (application configuration 3). Although only three application configurations are shown for purposes of illustration, it is understood that a typical application library 101 may contain a significantly greater number of application configurations.

Administrators also contribute different computing resources, such as virtualization hosts, physically-provisioned servers, network addresses, etc., to the data center system 800. The computing resources are described within a logical resource pool 109, which divides the resources into resource categories, including processing power 111, memory 113, storage 115 and networking 117. The processing power 111 represents the number and capacity of virtualization hosts and the number of virtual machines that each virtualization host supports, and the number of physical servers if included. It is noted that physical servers are treated as separate entities in which each may be provisioned as a single application server within an application configuration. The memory 113 describes the total amount of available volatile memory provided on the virtualization hosts for supporting software and applications, such as random access memory (RAM) and the like. The storage 115 represents the amount of non-volatile disk drive storage provided in the system including total storage on each virtualization host and the shared storage 807. The networking resources 117 includes available network resources, such as, for example, specific media access control (MAC) addresses, internet protocol (IP) network addresses, etc.

Users request a particular application configuration as needed, shown as application requests 121. In one embodiment, users select from among predefined application configurations within the application library 101. In another embodiment, the user may request a new or different application configuration which is defined and constructed from the resource pool and stored within the application library 101. The on-demand application delivery system 100 includes a resource manager 119 interfacing the application library 101 and the logical resource pool 109. The resource manager 119 receives each application request 121 for a particular application configuration, matches the application configuration with those provided in the application library 101 to identify the application configuration's resource requirements, and compares the application configuration's resource requirements against the available pooled computing resources provided in the logical resource pool 109. If sufficient resources are available in the logical resource pool 109 to meet the application request 121 either immediately or at a future time requested, the resource manager 119 reserves those resources for the time requested, enabling the chosen application configuration to be deployed to the reserved resources and made available to the requesting user at the appropriate time. When an application configuration is to be deployed, the resource manager 119 cooperates with a deployment manager 123, which accesses the logical resource pool 109 and deploys the application configuration as a deployed application 125. In one embodiment, the resource manager 119 is involved in deployment of each requested application configuration. The resource manager 119 also tracks deployed and pooled resources, and schedules computer resource assets for future application requests (see FIG. 5). The deployed application 125 may include any combination of physical and virtual machines or servers.

Figure 2:
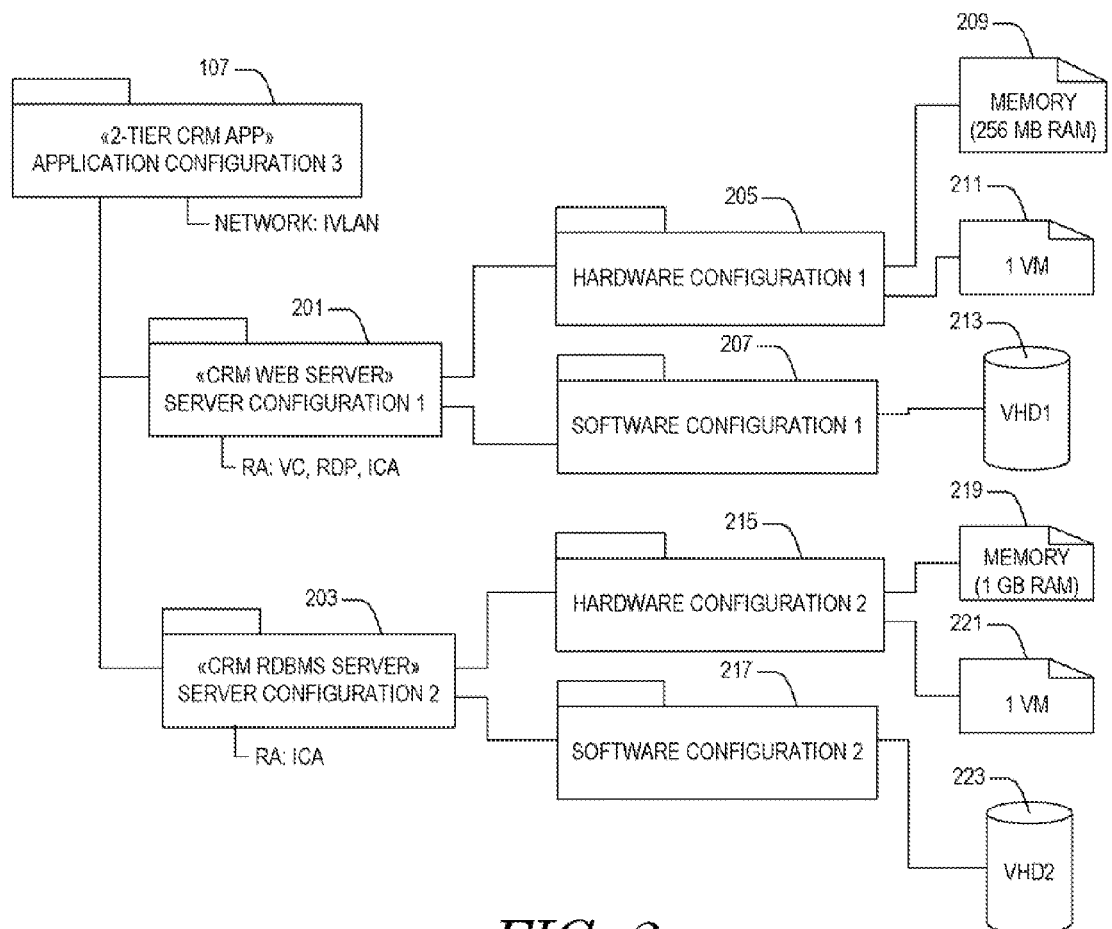
FIG. 2 is a block diagram illustrating exemplary decomposition of the application configuration of the application library of FIG. 1 according to one embodiment.

FIG. 2 is a block diagram illustrating exemplary decomposition of the application configuration 107 of the application library 101 according to one embodiment. The application configuration 107 is a 2-Tier contact relationship management (CRM) application having a "recipe" that includes two servers including a CRM web server 201 and a CRM relational database management system (RDBMS) server 203. The server 201 includes a hardware configuration 205 and a corresponding software configuration 207. The hardware configuration 205 includes a certain amount of memory 209, such as 256 megabytes (MB) of RAM as illustrated, and a virtual machine 211. The software configuration 207 includes a virtual hard disk (VHD) 213 storing a set of files used to establish the software configuration for the first server 201. The set of files includes those files establishing a predetermined operation system (OS) configuration and corresponding software applications that execute on the predetermined OS to establish the CRM web server. As understood by those skilled in the art, a virtual machine is provisioned with a specified amount of memory, the VHD 213 is retrieved and "attached" to the provisioned virtual machine to form a virtual server, and the server 201 is activated on a virtualization host, such as within the virtual server cloud 803. The server 203 includes a hardware configuration 215 with memory 219, shown as 1 gigabyte (GB) of RAM, and a virtual machine 221 and a software configuration 217 linked to a VHD 223. The server 203 is also activated and the two servers 201 and 203 are linked together and delivered as the application configuration 107 when deployed.

Alternatively, if any one of the physical servers 805 is configured according to the server configuration of server 201 or 203, or if a pair of physical servers are configured according to both servers 201 and 203, then those physical servers may be deployed as the application configuration 107.

An application configuration further provides the networking specification which defines the relationship between the server configurations. As shown in FIG. 2, the application configuration 107 defines a networking specification as an isolated virtual local area network (IVLAN) in which the servers 201 and 203 are linked together to communicate with each other in an isolated VLAN. Server configurations also prescribe a remote access experience, which defines the manner in which users requesting a particular application configuration should access individual servers within that deployed application. Each server configuration has a collection of prescribed remote access (RA) protocols appropriate to a deployed instance of that server, based on the remote access facilities present in the software resident in the virtual hard disk (e.g., VHD1 213 and VHD2 223) and based on the purpose of the server configuration itself within the context of a deployed application. For example, exemplary remote access options include the Remote Desktop Protocol (RDP) by Microsoft®, the Independent Computing Architecture (ICA) by Citrix®, the open-source Virtual Network Computing (VNC) protocol, the applicable virtualized console (VC) provided by the particular virtualization vendor, etc. As shown, the prescriptive remote access for server 201 includes VC, RDP and ICA and prescriptive remote access for server 203 includes ICA.

Figure 3:
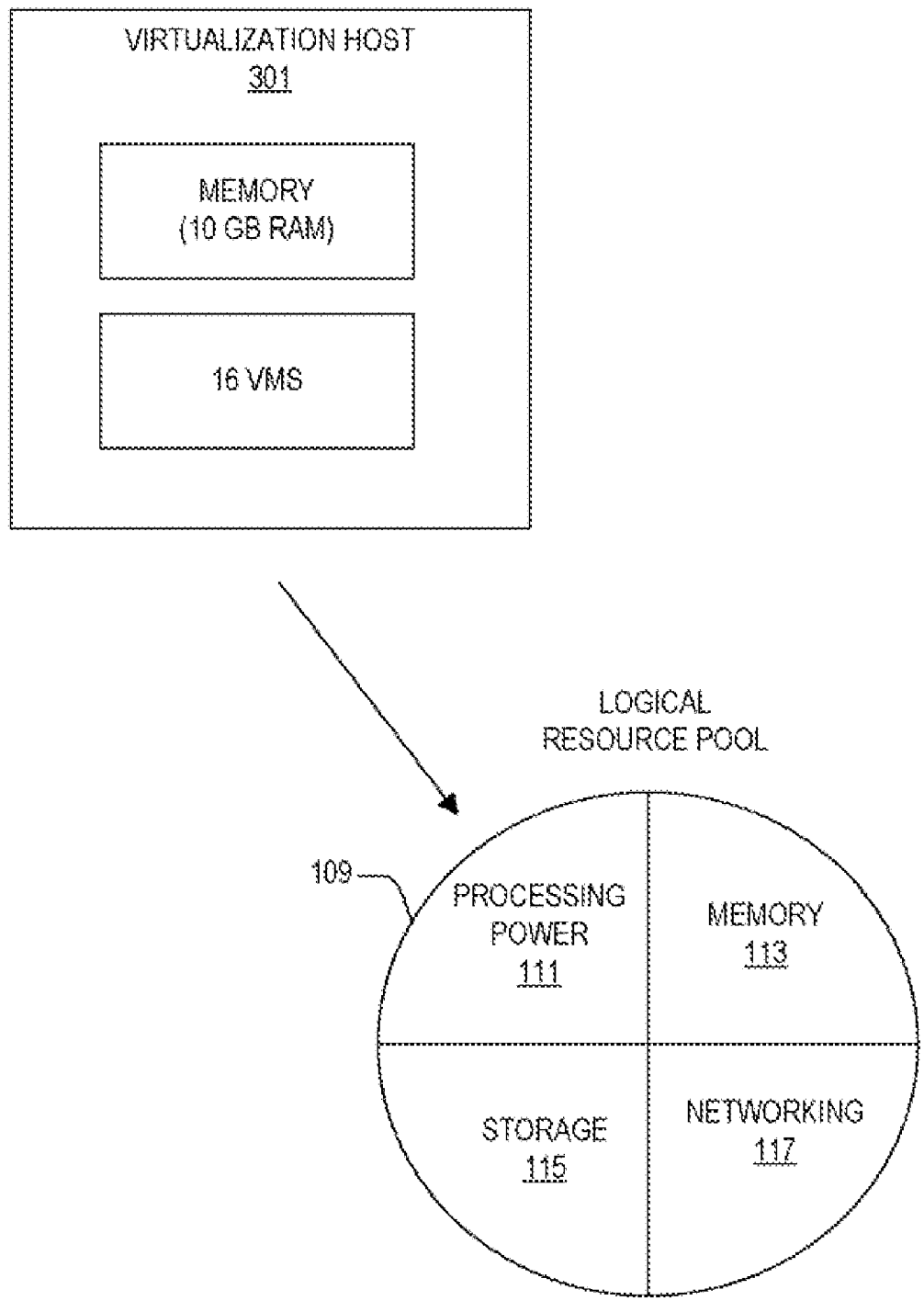
FIG. 3 is a graphic diagram illustrating the resource contribution of an exemplary virtualization host of the data center system of FIG. 8 to the logical resource pool of FIG. 1.

FIG. 3 is a graphic diagram illustrating the resource contribution of an exemplary virtualization host 301 of the data center system 800 to the logical resource pool 109. In this case, the virtualization host 301 contributes 10 GB of usable RAM as well as the central processing unit (CPU) capacity to support up to 16 concurrent virtual machines. A system according to one embodiment models capacity to satisfy the needs of on-demand application delivery. In order to deliver the 2 applications using server virtualization technology, for example, the system decomposes a virtualization host into its constituent assets, including a certain amount of usable random access memory (RAM) and a certain degree of supported concurrency. Concurrency refers to the ability to run a number of virtual machines, such as up to 16 VMs supported by the virtualization host 301.

The physical servers 805 may also contribute to the logical resource pool 109 in an individual capacity. Physical servers generally do not support concurrency and are not decomposed into their constituent parts. In particular, each "raw" physical server is preconfigured according to a particular hardware configuration. In other words, a physical server typically has a fixed hardware configuration, but can be provisioned to serve as any number of software configurations utilizing a number of different physical provisioning tools readily available to someone skilled in the art. Furthermore, it can only be allocated for use as an indivisible entity.

Figure 4:
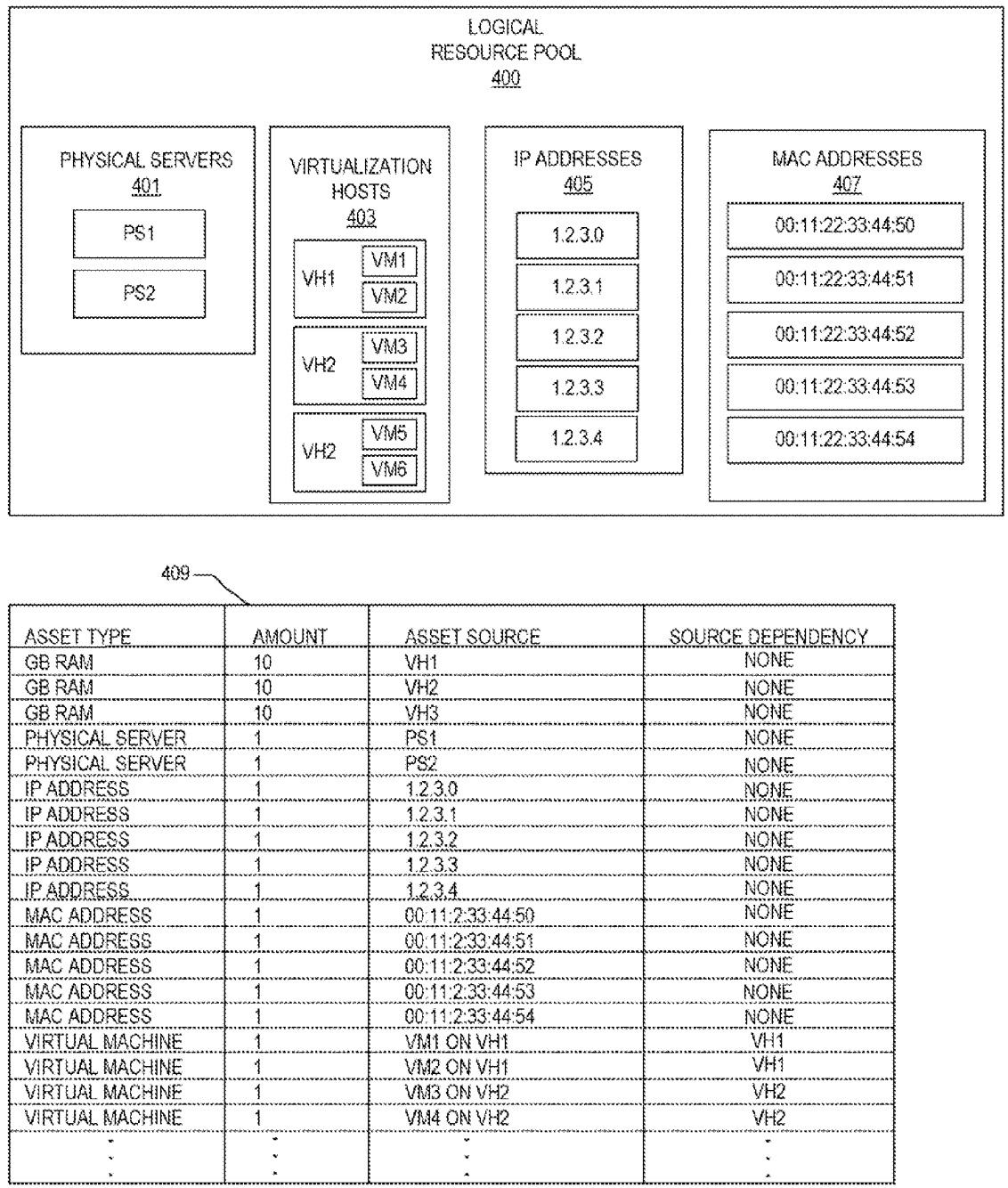
FIG. 4 is a graphic diagram illustrating an exemplary logical resource pool according to one embodiment.

FIG. 4 is a graphic diagram illustrating an exemplary logical resource pool 400 according to one embodiment. The same pooling model is applied to other types of computing capacity, including physically-provisioned servers and network addresses. In this case, the logical resource pool 400 includes a pair of physical servers 401 (PS1 and PS2) and 3 virtualization hosts 403 (VH1, VH2, VH3). Each virtualization host 403 contributes a certain amount of memory and concurrency in the form of a supported number of virtual machines. As shown, VH1 supports virtual machines VM1 and VM2, VH2 supports virtual machines VM3 and VM4, VH3 supports virtual machines VM5 and VM6, etc. The logical resource pool 400 also includes a certain number of specific IP addresses 405 and MAC addresses 407. The specific resources of the logical resource pool 400 are listed in a corresponding table 409. Each row in the table 409 represents one pooled "asset." An asset is defined by an asset type (e.g. GB RAM, physical server, MAC Address, IP address, virtual machine, etc.), an asset source (the real resource contributing the asset), and an amount of the resource or asset. In the illustrated pooling model, the pooled resources are decomposed into an appropriate level of granularity such that the use of all or a portion of an asset is sufficient to fully define and identify the actual computing capacity being used.

As shown in table 409, each virtualization host 403 contributes 10 GM RAM of memory. The physical servers 401 PS1 and PS2 have preconfigured hardware configurations and are contributed without further granularity. Each MAC and IP address is listed separately in table 409. Table 409 also lists multiple virtual machines, shown as VM1, VM2, VM3, VM4, etc., supported by the virtualization hosts VH1-VH3. Although each virtualization host is shown supporting two virtual machines for purposes of illustration, it is understood that each virtualization host may contribute any number of virtual machines to the logical resource pool 400.

When consuming 1 GB of RAM on VH1, it is sufficient to account for the memory usage by decrementing the 10 GB of available RAM by 1 GB, leaving 9 GB still available. It is not necessary to specifically define which exact bytes of RAM are to be used out of the total 10 GB available, since the operating system of each virtualization host manages RAM allocation on a per-process basis. However, when consuming 1 virtual machine on VH1, the system accounts for that specific virtual machine individually in order to track exactly which virtual machine is in use. As such, each virtual machine is represented as a unique asset, while the entire sum of pooled RAM from a virtualization host is aggregated into one asset. In a similar manner to pooled virtual machines, other computing resources are indivisible and require dedicated accounting of their availability, including physically-provisioned servers and network addresses, which are modeled as discrete assets.

In one embodiment, an "asset" object within the pooling model includes the concept of one asset source explicitly depending upon another asset source, referred to as source dependency. This allows logically related computing capacity to be decomposed into different asset sources, yet still be used or allocated together. One example of this relationship is that the assets contributed by a VM may depend upon assets contributed by the corresponding virtualization host. As shown, the virtual machines sourced by VM1 and VM2 have a source dependency of VH1, the virtual machines sourced by VM3 and VM4 have a source dependency of VH2, etc. If there is no source dependency, table 409 lists the source dependency as "NONE". The resource manager 119 has access to this dependency relationship in order to ensure that RAM is reserved from the same virtualization host as is depended upon by the reserved VM. In other words, without this relationship, the resource manager 119 might very well allocate RAM from VH1 and a particular VM residing on VH2, which could cause an invalid hardware configuration.

Figure 5:
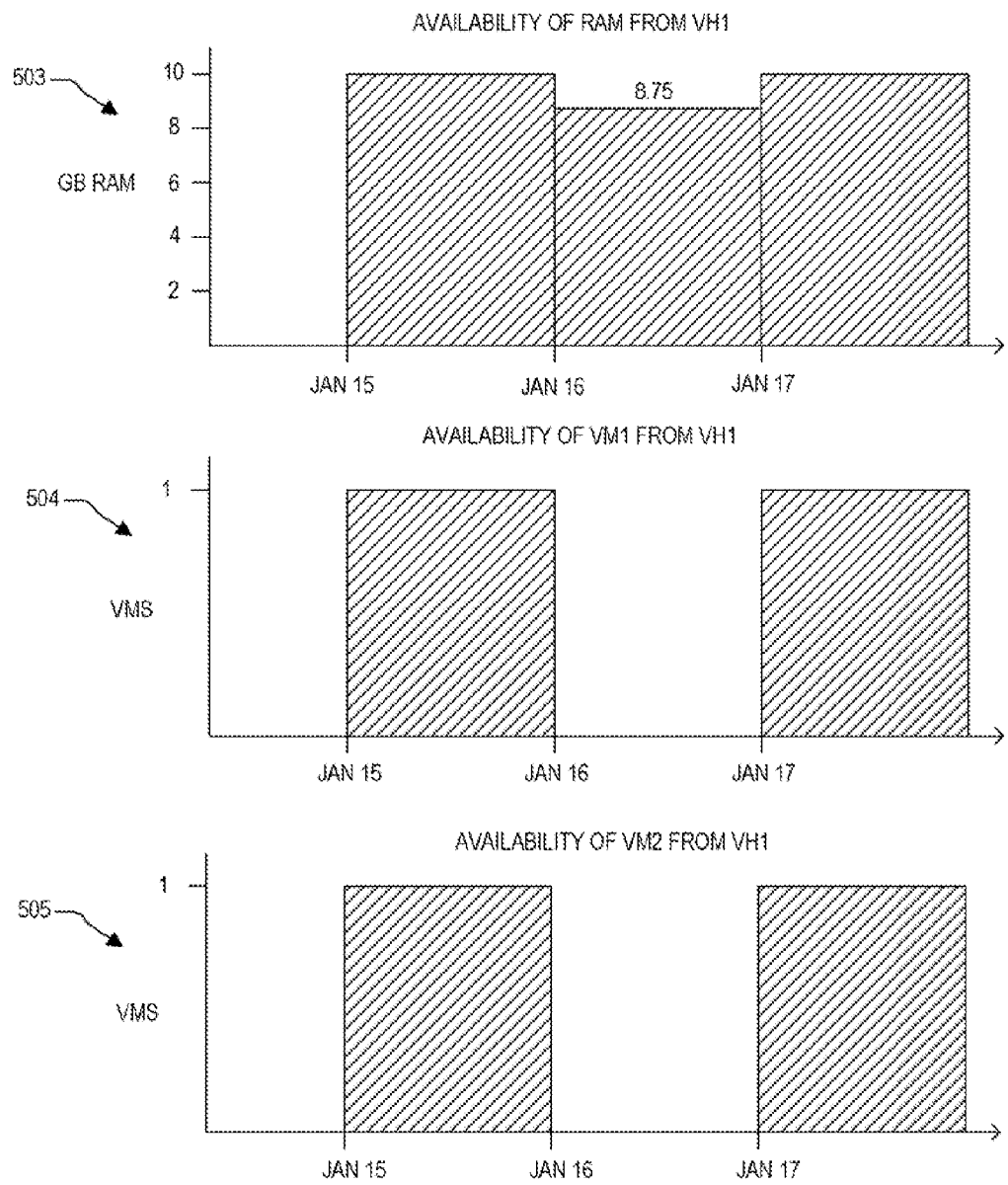
FIG. 5 is a graphic diagram illustrating tracking the availability of each asset over time according to an exemplary embodiment.

A system according to one embodiment performs the task of accounting for pooled asset usage. The table 409 lists all the assets in a pool without regard for tracking the consumption of those assets. A separate persistence model is used by the resource manager 119 to track asset usage. When including time in the usage tracking model, however, the capacity pooling system serves as a resource scheduling system, supporting the ability for users to schedule the delivery of an application for a specific duration some time in the future. FIG. 5 is a graphic diagram illustrating tracking the availability of each asset over time according to an exemplary embodiment. As shown, VH1 is contributed to the resource pool at a particular point in time, such as on January 15. Three of the assets of the VH1 are represented in a table 501, including its total memory capacity of 10 GB and the first two virtual machines VM1 and VM2. A user requests the delivery of the 2-Tier application configuration 107 from January 16 through January 17. Three charts 503, 504 and 505 are shown representing the availability of the assets contributed by VH1 over the three day period from January 15 to January 17 as tracked by the resource manager 119. The first chart 503 illustrates the availability of the 10 GB RAM of memory, the second chart 504 illustrates the availability of VM1, and the third chart 505 illustrates the availability of VM2. As shown by charts 504 and 505, VM1 is fully allocated from January 16-17 for one of the tiers in the application, and VM2 is also fully allocated over the same period as the second tier. As shown by chart 503, both VMs are given a portion of the total memory of the VH1, including 1 GB for the server 203 and 256 MB of RAM for the server 201. The total memory deployed translates to 1.25 GB of memory of the VH1 being committed for the period between January 16 to 17, leaving only 8.75 GB available from VH1 during that time.

An on-demand application delivery system with capacity pooling according to one embodiment includes a logical resource pool, an application library, a resource manager, and a deployment manager. The logical resource pool includes computer resource assets which includes asset type, amount, and asset source in which each computer resource asset is decomposed to a specified level of granularity. The application library includes application configurations, each including at least one server configuration which includes computer resource asset requirements. The resource manager tracks availability of the computer resource assets, receives requests for application configurations, compares each requested application configuration with available computer resource assets, and reserves resources for each requested application configuration. The deployment manager deploys each requested application configuration using the reserved resources.

A data center system according to one embodiment includes a shared network, one or more virtualization hosts coupled to the shared network, and an on-demand application delivery system. Each virtualization host supports at least one virtual machine. The on-demand application delivery system a logical resource pool, an application library, a resource manager, and a deployment manager as previously described. The on-demand application delivery system may be supported by one of the virtualization hosts, by a dedicated virtualization host, one or more physical servers, etc.

A method of on-demand application delivery with capacity pooling according to one embodiment includes providing computer resource assets including asset type, amount, and asset source, decomposing each computer resource asset to a specified level of granularity, defining application configurations, each including at least one server configuration which includes computer resource asset requirements, tracking availability of the computer resource assets, receiving a request for an application configuration, comparing the requested application configuration with available computer resource assets, and reserving resources for the requested application configuration, and deploying the requested application configuration using the reserved resources.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention.

The invention claimed is:

1. A data center system, comprising:
a shared network;
at least one dedicated virtualization host supporting at least one virtual machine coupled to said shared network;
at least one physical server coupled to said shared network; and
an application reservation and delivery system, comprising:
a logical resource pool comprising a plurality of computer resource assets including asset type, amount, and asset source, in which each of said plurality of computer resource assets is decomposed to a specified level of granularity;
an application library comprising a plurality of application configurations, each of said application configurations comprising at least one server configuration which comprises computer resource asset requirements and which describes a configuration server, and a networking specification for the application configuration;
a resource manager, which receives requests for one of the application configurations for a specified future time period as compared to the time of the request, which compares said requested application configuration with available computer resource assets, which tracks availability of said computer resource assets over time for scheduling deployment of said requested application configuration at said future time period and which reserves resources for said requested application configuration when available during said future time period; and
a deployment manager which deploys at least one server configured according to said requested application configuration using said reserved resources and which provides said at least one server to a remote user via the shared network during said future time period.

2. The data center system of claim 1 wherein said at least one dedicated virtualization host provides at least one virtual machine supporting said application reservation and delivery system.

3. The data center system of claim 1 further comprising the dedicated virtualization host coupled to said shared network and providing at least one virtual machine supporting said application reservation and delivery system.

4. The data center system of claim 1 further comprising the at least one physical server coupled to said shared network and supporting said application reservation and delivery system.

5. The data center system of claim 1 wherein said asset source comprises a virtualization host with memory which sources a portion of said memory as a divisible computer resource asset to said logical resource pool.

6. The data center system of claim 1 wherein said asset source comprises a virtual machine as an indivisible computer resource asset provided to said logical resource pool.

7. The data center system of claim 6 wherein said indivisible computer resource asset depends upon a virtualization host which hosts said virtual machine.

8. The data center system of claim 1 wherein said asset source comprises a network address as an indivisible computer resource asset provided to said logical resource pool.

9. The data center system of claim 1 wherein said asset source comprises a physical server as an indivisible computer resource asset provided to said logical resource pool.

10. The data center system of claim 1 wherein said at least one server configuration comprises a hardware configuration and a software configuration.

11. The data center system of claim 10 wherein said hardware configuration comprises a virtual machine and a prescribed amount of memory and wherein said software configuration comprises a predetermined disk image attached to said virtual machine.

12. The data center system of claim 1 wherein said at least one server configuration comprises a plurality of server configurations and a networking specification for said plurality of server configurations.

13. The data center system of claim 1 further comprising a prescriptive remote access protocol describing remote access to at least one deployed server configured according to said requested application configuration.

14. A method of application reservation and delivery with capacity pooling, comprising:
providing at least one dedicated virtualization host supporting at least one virtual machine coupled to a shared network;
providing at least one physical server coupled to said shared network;
providing a logical resource pool having a plurality of computer resource assets including asset type, amount, and asset source;
decomposing each computer resource asset to a specified level of granularity;
defining, in an application library, a plurality of application configurations, each of said configurations comprising at least one server configuration which comprises computer resource asset requirements and which describes a configuration of a server, and a networking specification for the application configuration;
receiving by a resource manager, a request for one of the application configurations for a specified future time period as compared to the time of request, comparing, by the resource manager using a processing unit, the requested application configuration with available computer resource assets during the future time period, tracking by the resource manager, availability of said computer resource assets over time for scheduling deployment of said requested application configuration at said future time period and reserving, by the resource manager, resources for the requested application configuration when available during the future time period;
deploying, by the deployment manager, at least one server configured according to the requested application configuration using the reserved resources during the future time period; and
providing the deployed server configured according to the requested application configuration to a remote user via the shared network during said future time period.

15. The method of claim 14 wherein said providing a plurality of computer resource assets comprises providing a virtualization host with memory which sources a portion of the memory as a divisible computer resource asset.

16. The method of claim 15 wherein said providing a plurality of computer resource assets comprises providing a virtual machine as an indivisible computer resource asset which is hosted by the virtualization host.

17. The method of claim 14 wherein said defining comprises defining at least one server configuration including a virtual machine with a prescribed amount of memory and a predetermined disk image attached to the virtual machine.

18. The method of claim 14 wherein said defining comprises defining a plurality of server configurations for an application configuration and a networking specification for the application configuration.

19. The method of claim 14 wherein said defining comprises defining a prescriptive remote access protocol describing remote access to at least one deployed server configured according to the requested application configuration.

20. The method of claim 14 wherein said tracking comprises tracking availability of the computer resource assets over time and scheduling deployment of at least one server configured according to a requested application configuration at a future time.

* * * * *